United States Patent [19]
Miller et al.

[11] Patent Number: 4,841,468
[45] Date of Patent: Jun. 20, 1989

[54] HIGH-SPEED DIGITAL MULTIPLIER ARCHITECTURE

[75] Inventors: Bruce E. Miller, Aloha, Oreg.; Robert E. Owen, Saratoga, Calif.

[73] Assignee: Bipolar Integrated Technology, Inc., Beaverton, Oreg.

[21] Appl. No.: 28,360

[22] Filed: Mar. 20, 1987

[51] Int. Cl.$^4$ ............................................. G06F 7/52
[52] U.S. Cl. ........................................ 364/754; 364/757
[58] Field of Search ............... 364/754, 757, 758, 759, 364/760, 736, 787, 745

[56] References Cited

U.S. PATENT DOCUMENTS

| | | | |
|---|---|---|---|
| 4,571,701 | 2/1986 | Lerouge | 364/757 |
| 4,718,031 | 1/1988 | Nukiyama | 364/754 |

OTHER PUBLICATIONS

Downing, P. et al., "Denser Process Gets the Most Out of Bipolar VLSI," Electronics, pp. 131-133, Jun. 28, 1984.
"A Bipolar Process That's Repelling CMOS," Electronics, pp. 45-47, Dec. 23, 1985.
Kaji, Y. et al., "A 45ns. 16×16 CMOS Multiplier," ISSCC Digest of Technical Papers, pp. 84-85, Feb. 1984.
"Surprise! ECL Runs on Only Microwatts," Electronics, pp. 35-38, Apr. 7, 1986.
G. Wilson, "Creating Low-Power Bipolar ECL at VLSI Densities," VLSI Systems Design, pp. 84-86, May, 1986.

Primary Examiner—Gary V. Harkcom
Assistant Examiner—Long Thomas Nguyen
Attorney, Agent, or Firm—Marger & Johnson

[57] ABSTRACT

A high-speed digital multiplier architecture is implemented in a bipolar very large scale integrated circuit technology. Operand input and product output latches are independently enabled by inverted clock signals. The multiplier can be operated in unclocked, separately clocked and single clock or master-slave modes of operation. The multiplier can be operated to concatenate, rather than multiply, the operands and thereby load the operands directly from the inputs to the output. A selectable format adjust performs a one bit left shift on the product. A low order zero bit is inserted in the shifted product, an overflow flag is set in case the product is $-1.0 \times -1.0 = 1.0$, and rounding is correct for both adjusted and unadjusted products. A zero flag is provided which is correct for both rounded and unrounded output products. A negative flag provides an unambiguous indicator of product sign in signed and mixed mode or format adjusted operation.

35 Claims, 15 Drawing Sheets

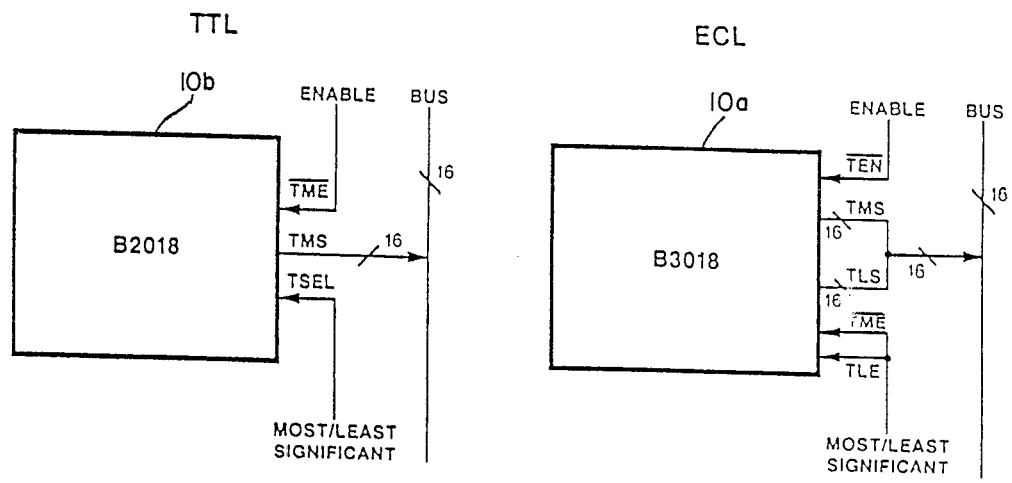

FIG. 4

FLAG: ZERO | NEG

LOAD = 1    $Z = X | Y$

| XM = 0 | Z | 0 |
| XM = 1 | Z | $Z_{31}$ |

LOAD = 0    $Z = X \cdot Y$

Unsigned Integer (XM = YM = 0)

Signed or Mixed Mode Integer (XM = YM = 1 or XM ≠ YM)

Unsigned Fractional (XM = YM = 0)

Mixed Mode Fractional (XM ≠ YM)

Signed Fractional (XM = YM = 1)

Z = NOR $Z_0$–$Z_{31}$ when RND = 0
Z = NOR $Z_{16}$–$Z_{31}$ when RND = 1, FA = 1
Z = NOR $Z_{15}$–$Z_{31}$ when RND = 1, FA = 0

FIG. 5

FLAG [OVFL] — W RESULT

$W_{31}|W_{30}|W_{29}|W_{28}|W_{27}|W_{26}|W_{25}|W_{24}|W_{23}|W_{22}|W_{21}|W_{20}|W_{19}|W_{18}|W_{17}|W_{16}|W_{15}|W_{14}|W_{13}|W_{12}|W_{11}|W_{10}|W_9|W_8|W_7|W_6|W_5|W_4|W_3|W_2|W_1|W_0$

FORMAT ADJUST = 1 [ 0 ]

Signed Fractional (XM = YM = 1) — VALUE $Z_{31}|Z_{30}|Z_{29}|Z_{28}|Z_{27}|Z_{26}|Z_{25}|Z_{24}|Z_{23}|Z_{22}|Z_{21}|Z_{20}|Z_{19}|Z_{18}|Z_{17}|Z_{16}|Z_{15}|Z_{14}|Z_{13}|Z_{12}|Z_{11}|Z_{10}|Z_9|Z_8|Z_7|Z_6|Z_5|Z_4|Z_3|Z_2|Z_1|Z_0$ $-2^1|2^0|2^{-1}|2^{-2}|2^{-3}|2^{-4}|2^{-5}|2^{-6}|2^{-7}|2^{-8}|2^{-9}|2^{-10}|2^{-11}|2^{-12}|2^{-13}|2^{-14}|2^{-15}|2^{-16}|2^{-17}|2^{-18}|2^{-19}|2^{-20}|2^{-21}|2^{-22}|2^{-23}|2^{-24}|2^{-25}|2^{-26}|2^{-27}|2^{-28}|2^{-29}|2^{-30}$

BINARY POINT

Signed or Mixed Mode Integer (XM = YM = 1 or XM ≠ YM) — VALUE $-2^{31}|2^{30}|2^{29}|2^{28}|2^{27}|2^{26}|2^{25}|2^{24}|2^{23}|2^{22}|2^{21}|2^{20}|2^{19}|2^{18}|2^{17}|2^{16}|2^{15}|2^{14}|2^{13}|2^{12}|2^{11}|2^{10}|2^9|2^8|2^7|2^6|2^5|2^4|2^3|2^2|2^1|2^0$

BINARY POINT

FORMAT ADJUST = 0 [ V ]

Signed Fractional (XM = YM = 1) — VALUE $Z_{30}|Z_{29}|Z_{28}|Z_{27}|Z_{26}|Z_{25}|Z_{24}|Z_{23}|Z_{22}|Z_{21}|Z_{20}|Z_{19}|Z_{18}|Z_{17}|Z_{16}|Z_{15}|Z_{14}|Z_{13}|Z_{12}|Z_{11}|Z_{10}|Z_9|Z_8|Z_7|Z_6|Z_5|Z_4|Z_3|Z_2|Z_1|Z_0|0$ $-2^{0}|2^{-1}|2^{-2}|2^{-3}|2^{-4}|2^{-5}|2^{-6}|2^{-7}|2^{-8}|2^{-9}|2^{-10}|2^{-11}|2^{-12}|2^{-13}|2^{-14}|2^{-15}|2^{-16}|2^{-17}|2^{-18}|2^{-19}|2^{-20}|2^{-21}|2^{-22}|2^{-23}|2^{-24}|2^{-25}|2^{-26}|2^{-27}|2^{-28}|2^{-29}|2^{-30}|2^{-31}$

BINARY POINT

Signed or Mixed Mode Integer (XM = YM = 1 or XM ≠ YM) — VALUE $-2^{30}|2^{29}|2^{28}|2^{27}|2^{26}|2^{25}|2^{24}|2^{23}|2^{22}|2^{21}|2^{20}|2^{19}|2^{18}|2^{17}|2^{16}|2^{15}|2^{14}|2^{13}|2^{12}|2^{11}|2^{10}|2^9|2^8|2^7|2^6|2^5|2^4|2^3|2^2|2^1|2^0|2^{-1}$

BINARY POINT $V = Z_{31} \text{ XOR } Z_{30}$

FIG. 6A $\overline{TEN} = 0$ $\overline{TME} = 0$ TLE $= 1$ $\overline{TME} = $ TLE $= 0$ $\overline{TME} = $ TLE $= 1$ $\overline{TEN} = 1$

FIG. 6B

TSEL $= 0$

TSEL $= 1$

FIG. 7A
UNCLOCKED
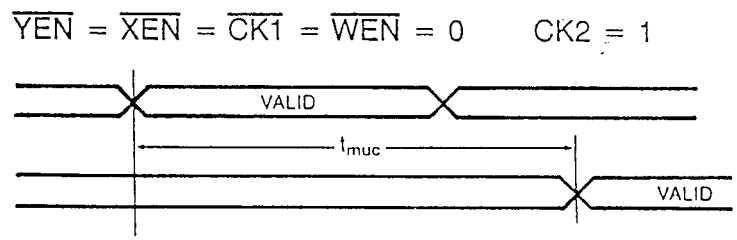
CLOCKED
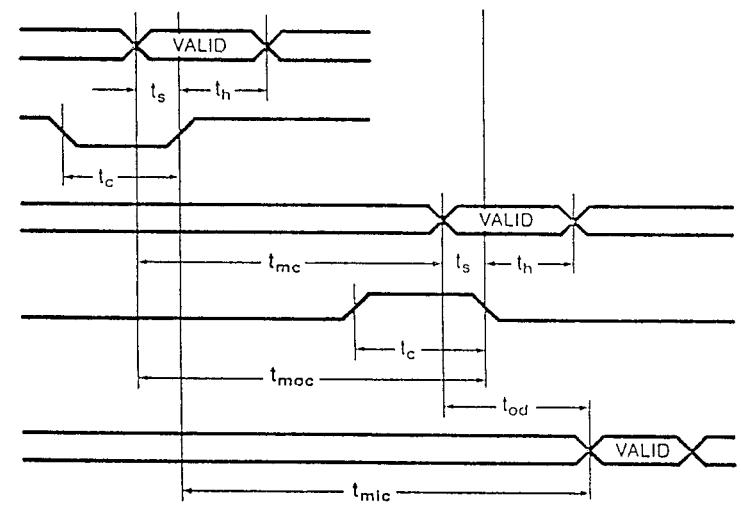
SINGLE CLOCK
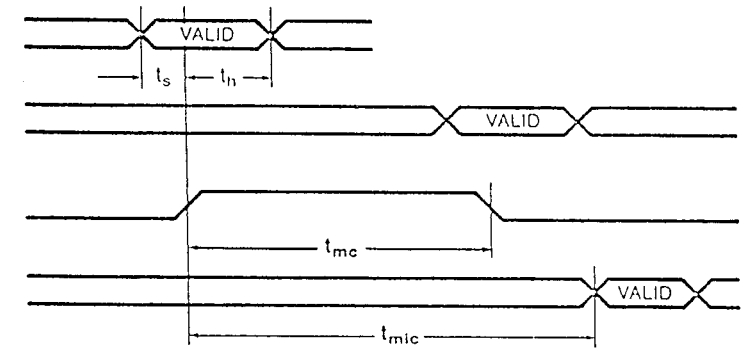
OUTPUT ENABLE
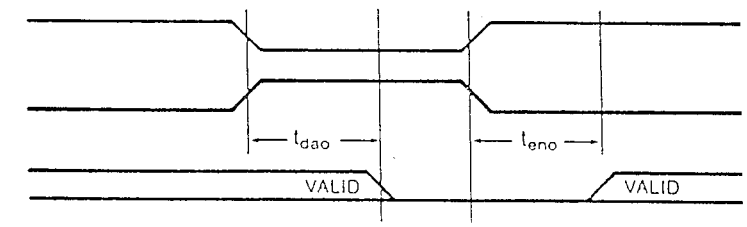

FIG. 7B
UNCLOCKED
X, Y, XM, I
T, OVFL, ZERO, NEG
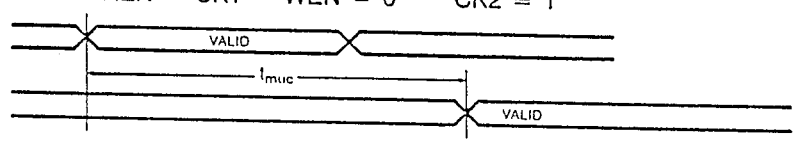
CLOCKED
X, Y, XM, YM, I
$\overline{CK1}$, $\overline{XEN}$, $\overline{YEN}$
W RESULT
CK2  ($\overline{WEN}$ = 0)
T, OVFL, ZERO, NEG
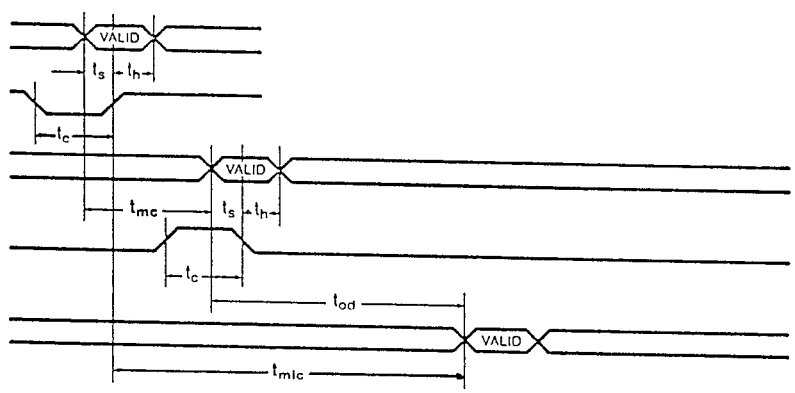
SINGLE CLOCK
X, Y, XM, YM, I
W RESULT
$\overline{CK1}$, $\overline{XEN}$, $\overline{YEN}$, CK2
($\overline{WEN}$ = 0)
T, OVFL, ZERO, NEG
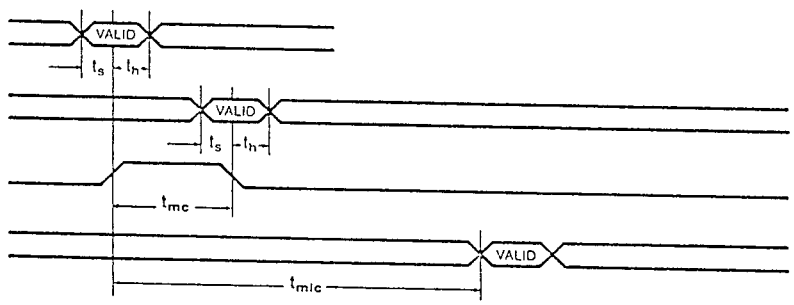
OUTPUT ENABLE
$\overline{TLE}$, $\overline{TME}$
TLS, TMS
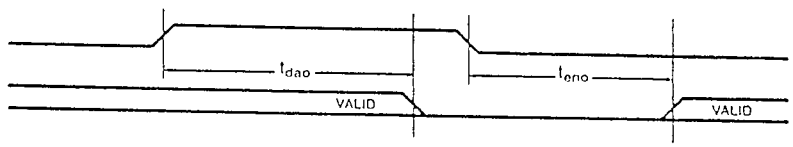

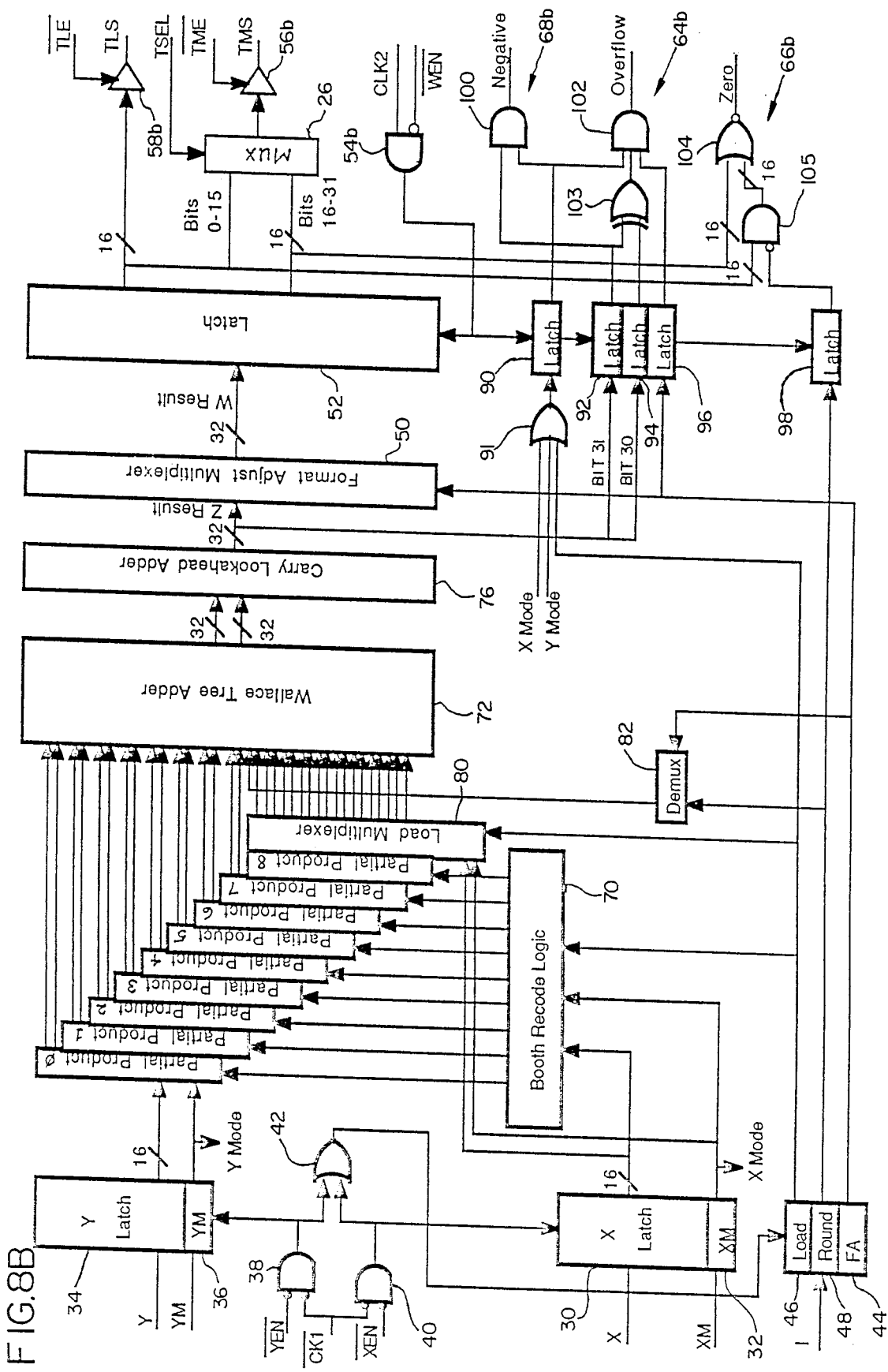

FIG. 9A
Clocking Alternatives
NO Clock (Flow-Through)
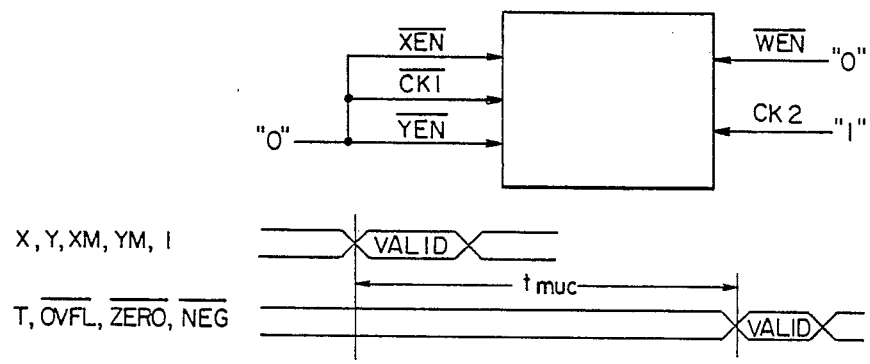
Single Clock (Master-Slave) With Enables
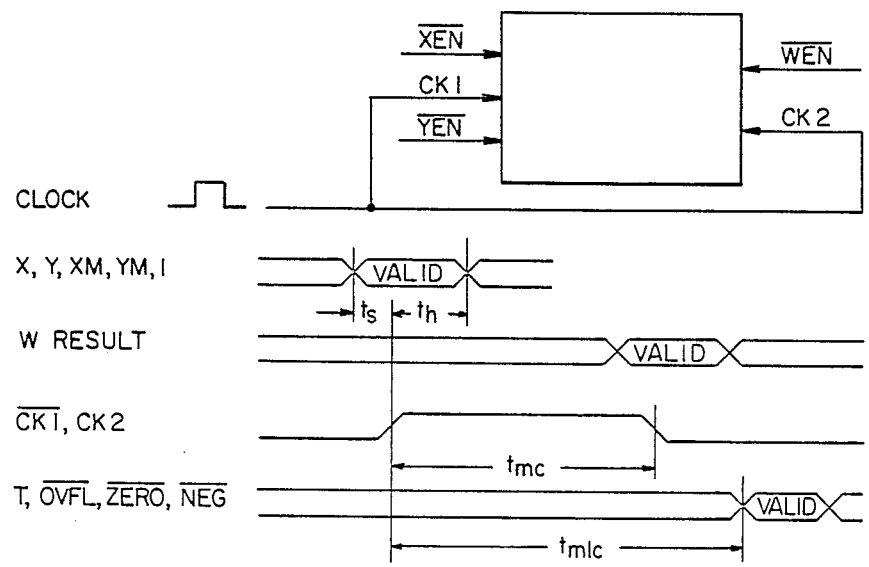

FIG. 9B
Clocking Alternatives
Two Clocks With Enables
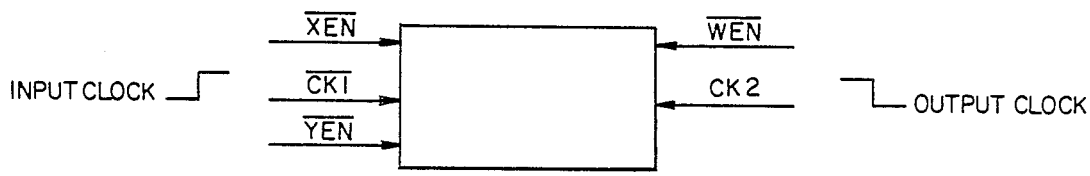
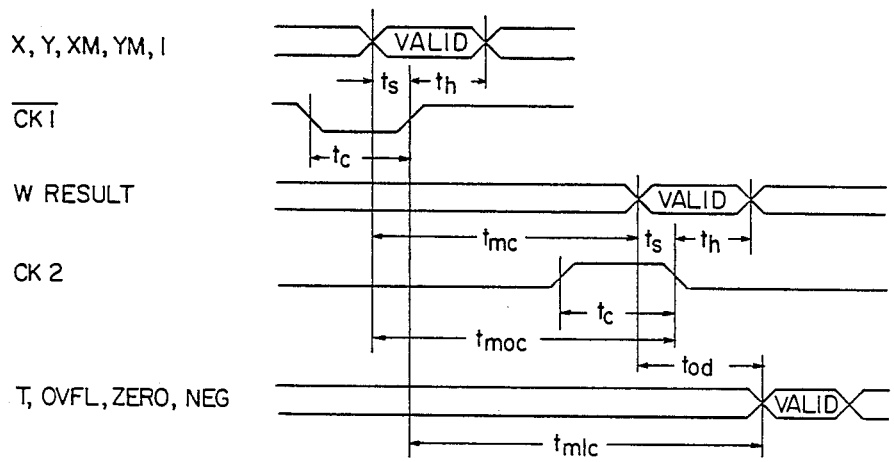
Or
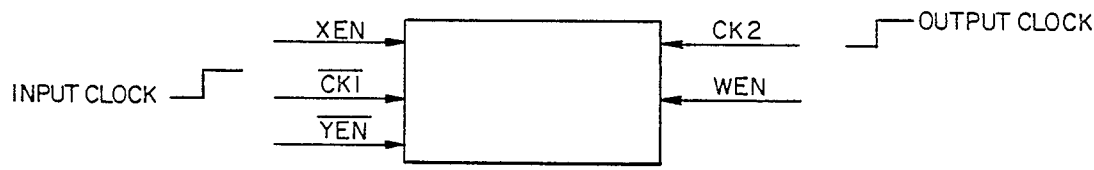

FIG. 9C
Clocking Alternatives
Three Clocks
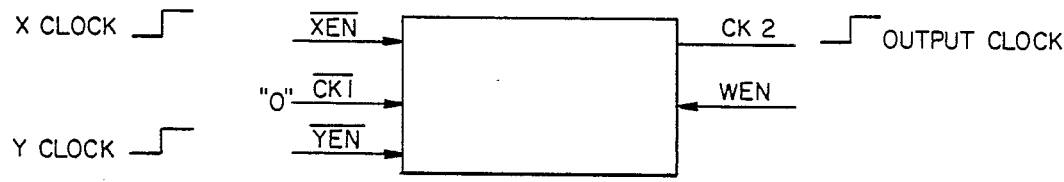
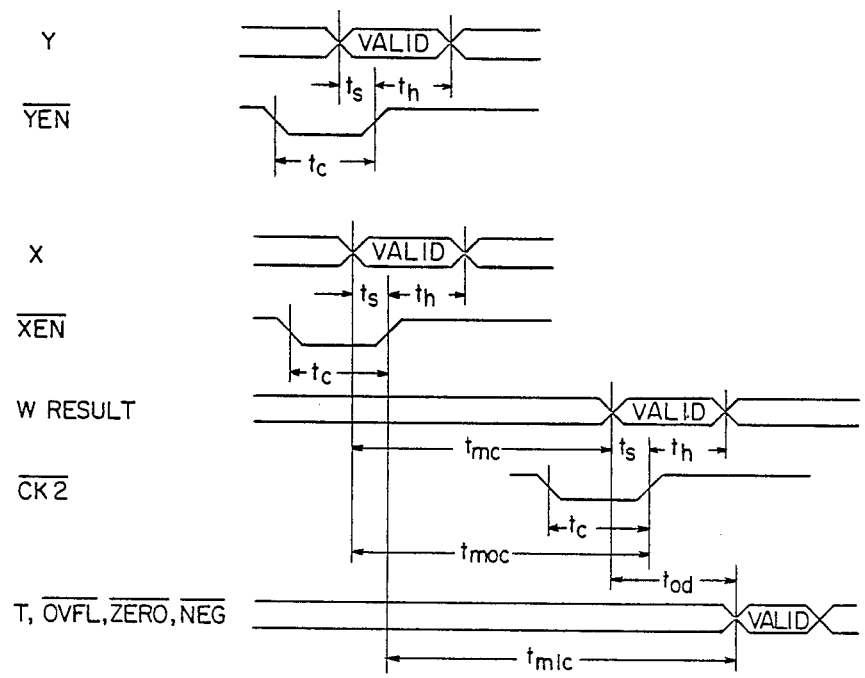

HIGH-SPEED DIGITAL MULTIPLIER ARCHITECTURE

BACKGROUND OF THE INVENTION

This invention relates generally to digital multipliers, and more particularly to high-speed, large scale integrated circuit multipliers for digital signal processing and general data processing applications.

Digital multipliers are one of the basic building blocks in digital signal and data processing systems. The conventional multiplier architectures that are in common use are generally very similar. A typical multiplier architecture has $2^n$-bit parallel inputs for an X operand and $2^n$-bit parallel inputs for a Y operand. These inputs are clocked into the multiplier through separate registers under control of clock enable circuitry. A full clock cycle is required to input the X and Y operands.

Conventional multiplication techniques use a modified Booth recoding scheme to generate partial products for the operands by pairs of bits, rather than single bits at a time. A Wallace tree configuration adder, with carry/save adders, is conventionally used to add up the partial products. A carry/lookahead adder is commonly used for adding the final products. The product is a binary number of $2^{n+1}$ parallel bits, which is commonly truncated or rounded to $2^n$ bits for output.

In large (e.g., 16×16 bit) general purpose multipliers, that may be used for signed fractional arithmetic, this product may be input as an intermediate product to a format adjusting shifter. In conventional practice, this shifter is designed to left-shift the most significant $2^n$ bits to align a binary point in the product with a binary point in one of the operands. The left shift truncates the highest order bit, which represents the $-1.0 \times -1.0$ product of $+1.0$ in two's complement binary arithmetic. It also produces an empty bit location between the most significant bits and the least significant $2^n$ bits. In conventional practice, it is customary to replicate the sign bit in this empty bit location.

The final product is output to an output register, which is controlled by clock enable circuitry similar to that of the input registers. Commercially-available multipliers have $2^n$ output lines and all output the most significant $2^n$ bits of the product. If the least significant $2^n$ bits of the product are to be output, these are multiplexed onto the output lines or onto input lines of one of the operands. To output a product of the $2^n$ most significant bits from the output registers requires a second full clock cycle and to output an entire product of $2^{n+1}$ bits requires two full clock cycles.

Typically, conventional multipliers incorporate a rounding feature. If rounding is used, the user cannot tell with certainty whether the correct product is zero.

The foregoing and other characteristics of conventional multiplier architectures turn out to be limiting and cumbersome to systems designers seeking to incorporate conventional multipliers in signal processing or data processing systems.

SUMMARY OF THE INVENTION

We have reassessed the architectural configuration of multipliers commonly used in conventional practice, particularly in light of the development of more advanced integrated circuit processes. Several such processes have recently been described in the literature, including: Downing, P., et al., "Denser Process Gets the Most Out of Bipolar VLSI," Electronics, pp. 131–133, June 28, 1984; "A Bipolar Process That's Repelling CMOS," Electronics, p. 45–47, Dec. 23, 1985; "Surprise! ECL Runs on Only Microwatts," Electronics, pp. 35–38, Apr. 7, 1986; and Wilson, G., "Creating Low-Power Bipolar ECL at VLSI Densities," VLSI Systems Design, pp. 84–86, May 1986.

These more advanced processes provided increased speed and device density and lower power dissipation levels, which in turn offer several significant benefits to the system designer and user. First, smaller transistors enable higher density and thereby allow implementation of more complex functions on a chip. Second, with greater density, the system designer can use fewer parts, and power requirements are reduced. As a result, the speed and throughput of the overall system can be increased because the parts interconnection delay can be readily reduced.

Following this reassessment, we designed a 16×16 bit multiplier and implemented it in an integrated circuit using the VLSI bipolar process described in the last two articles listed above. This new process allows a full 16-bits of precision with less power and higher speed than current 8-bit ECL components. With the multiplier architecture described below, total propagation time through the entire chip is typically 10 ns. The ECL version of this multiplier can run at clock speeds of 80 to 100 MHz. This is several times faster than the fastest known CMOS multipliers of comparable size (see, for example, Kaji, Y., et al., "A 45 ns. 16×16 CMOS Multiplier," ISSCC Digest of Technical Papers, pp. 84–85, February 1984).

Taking advantage of the higher speeds and functional densities at bipolar VLSI levels, and using a higher pin-count package than used in prior multipliers, we enhanced the multiplier architecture so as to incorporate features that were not possible before. Functionally, these enhancements fall into three categories: increased speed of overall multiplier operation; increased accuracy and certainty as to the various states of operation of the multiplier; and added capabilities of the multiplier. In terms of architectural features, we have incorporated a number of differences in our multiplier, over prior multipliers, and these differences serve in various combinations in the multiplier as a whole, to produce the various functional advantages identified above.

The multiplier of the invention is described with reference to a symmetric 16×16 bit multiplier but its principles can readily be generalized to a $2^n \times 2^n$ bit multiplier, for example, a 32×32 bit or 64×64 bit multiplier. Further, many principles of the invention can be applied to N×M bit multipliers, wherein N and M need not be equal or even numbers.

Format adjustment is provided in a way that differs from conventional multiplier designs. Format adjustment is an optional single-bit left shift to align the product binary point with that of the input operands when signed fractional data formats are used. In accordance with the invention, the entire product (e.g., 32 bits in a 16×16 multiplier) is shifted, rather than just the most significant (e.g., 16) bits of the product as in conventional multipliers. Three additional enhancements have been made in format adjustment. A left shift truncates the higher order bit which represents the $-1.0$ times $-1.0$ product of $+1.0$. This is now detected as an overflow condition and a status flag set. Also the sign bit is brought out separately as an unambiguous status flag which is correct for any format, overflow condition or portion of the product being output. Conventional multipliers replace the truncated bit by replicating the sign bit in the least significant 16-bit portion of the product. Instead, a lower order zero is inserted so that the full product is numerically correct after format adjustment. This also has the benefit of making the format adjustment useful for unsigned and/or integer formats: always providing a single bit arithmetic left shift as shown in FIG. 5. Rounding is recognized as a valuable feature when only the most significant (e.g., 16) bits of the product are to be retained. A binary one is added in the most significant bit position of the least significant 16-bit portion to accomplish rounding-to-nearest 16-bit values. The location of the additional bit tracks the format adjustment. Also, a zero status flag tracks the rounding operation and format adjustment. That is, the zero flag is set during rounding when only the rounded and format adjusted most significant output 16-bits are zero.

Another enhancement provided by the invention is the ability to load the output directly from the input operands rather than only through the multiplier. In response to a load instruction, the X and Y operands are concatenated into a single 32-bit result, instead of being multiplied. This signed or unsigned number can be rounded, format adjusted and tested for status just like the product. This is valuable not only for operations on previously generated products and variables but also for system test purposes. It provides for direct testing of each function and flag as well as a direct path from input buses to output bus.

Clock and data skews are a major system design consideration in high-speed multiplier design and application. Eight inches of printed-circuit board wiring has a one nanosecond delay, an appreciable fraction of the propagation time through a high speed multiplier array. Maximum flexibility in clocking and data storage is provided by the invention to maximize bandwidth. This has been done by including on-chip latches at all input and output data ports. These provide the minimum delay storage when used, yet can readily be made transparent by being left always enabled. Independent, inverse on-chip gating of the latch enables is provided. The enable inputs are nominally labeled as an input inverse clock (CK1) and an output clock (CK2) with individual enables for each latch, but they may be connected as a one, two or three clock device. A single clock connection made by paralleling (CK1) and CK2 provides an edge-triggered-like operation of a master-slave latch for the whole device.

The foregoing and other objects, features and advantages of the invention will become more readily apparent from the following detailed description which proceeds with reference to the drawings.

BRIEF DESCRIPTION OF THE DRAWINGS

FIG. 2 shows two simplified block diagrams of the ECL and TTL versions of the multipliers of FIGS. 1A and 1B, showing the connections of each version into a system for multiplexing the multiplier result on a 16 bit bus.

FIG. 3 is a diagram of input operand formats and sign mode operation for the multipliers of FIGS. 1A and 1B.

FIG. 4 is a diagram of the intermediate result Z formats, zero and negative status flags and load operation for the multipliers of FIGS. 1A and 1B.

FIG. 5 is a diagram of the final result W formats, overflow status flag and format adjust operation for the multipliers of FIGS. 1A and 1B.

FIG. 6A is a diagram of the output enable states for the multiplier of FIG. 1A.

FIG. 6B is a diagram of the multiplexer output for the different select states of the multiplier of FIG. 1B.

FIG. 7A is a timing diagram for the multiplier of FIG. 1A.

FIG. 7B is a timing diagram for the multiplier of FIG. 1B.

FIG. 8B is a more detailed block diagram of the multiplier of FIG. 1B.

FIGS. 9A, 9B and 9C are diagrams showing clocking alternatives for the multipliers of FIGS. 1A and 1B.

BRIEF DESCRIPTION OF THE TABLES

Figure 1A:
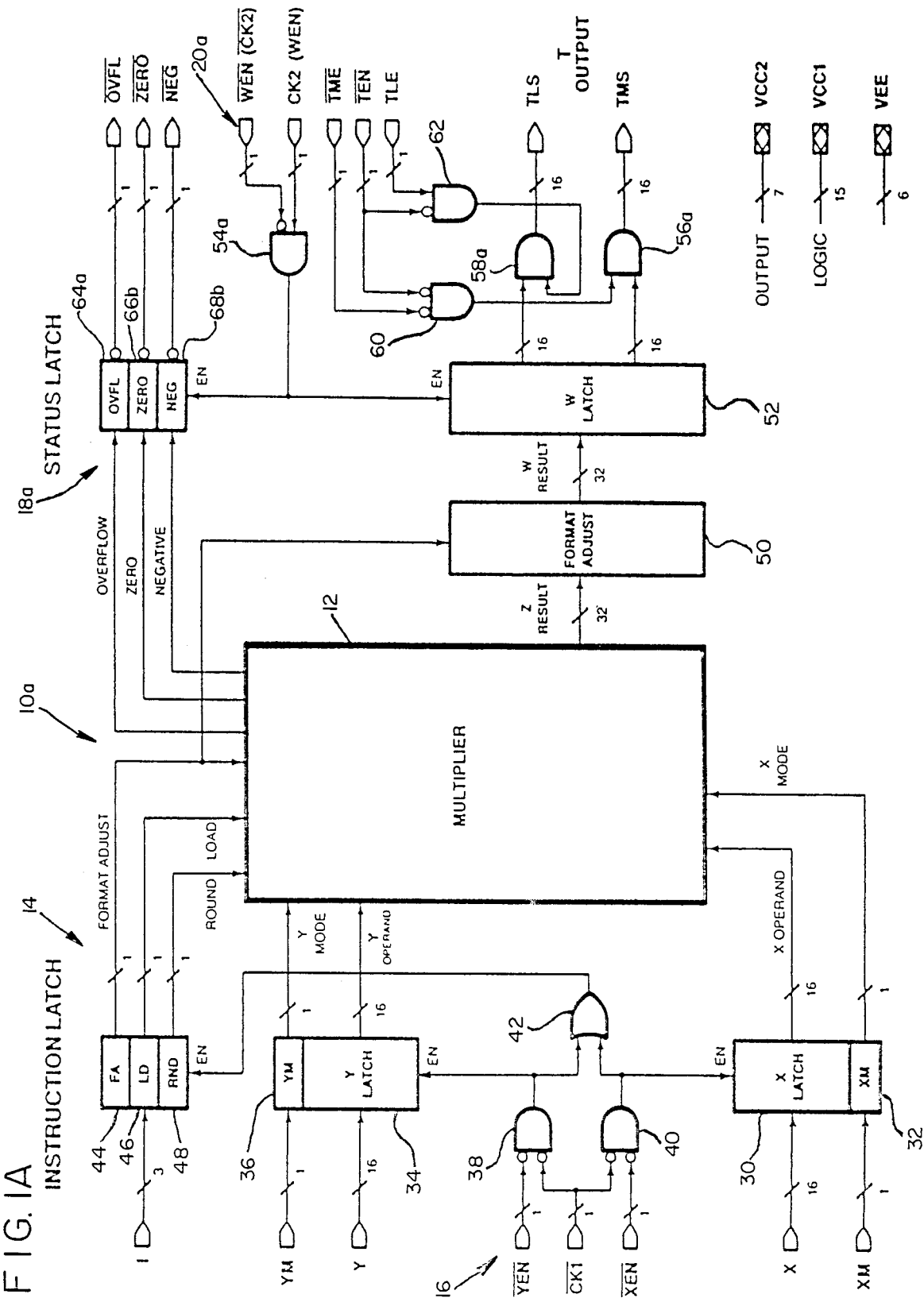
FIG. 1A is a functional block diagram of a multiplier according to the invention, arranged to be used in an emitter-coupled logic (ECL) system.
Figure 1B:
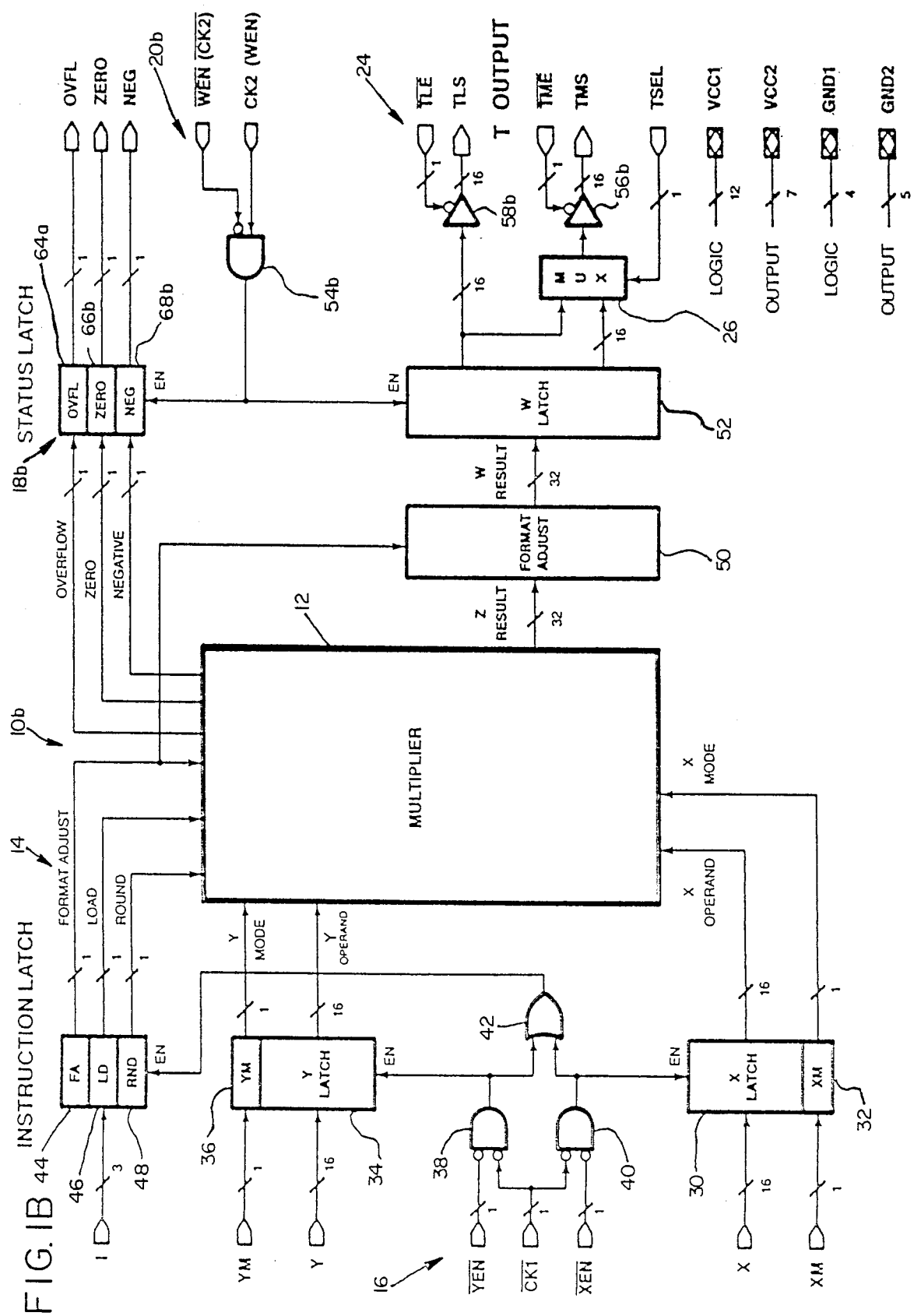
FIG. 1B is a multiplier similar to that of FIG. 1A, arranged to be used in a transistor-transistor logic (TTL) system.

Table 1A and 1B are tables of recommended operating and test conditions and electrical characteristics of the multipliers of FIGS. 1A and 1B, respectively, as implemented in a very large scale integrated circuit in accordance with a preferred embodiment of the invention.

Tables 2A and 2B identify the input and output signals and pins of integrated circuits embodying the multipliers of FIGS. 1A and 1B, respectively.

Tables 3A and 3B are glossaries defining the input and output signals for the multipliers of FIGS. 1A and 1B, respectively.

DETAILED DESCRIPTION

General Arrangement

Much of the architecture and circuitry of the multiplier of the present invention is common to both the ECL and TTL versions shown in the drawings. Propagation time through the multiplier is typically 10 ns. ECL 10 KH input and output buffers provide a low internal delay and, when driving terminated 50 ohm lines, provide a low output delay, even when bus structures are used. Ten ns. on-chip operation times can also provide a substantial benefit in TTL systems. Lead lengths are kept short so that loaded TTL output delays between chips are within the same range as operation times. Thus, pipelined data rates in the TTL multiplier can approach the scalar rates of the ECL multiplier. The TTL interface is preferably slowed to broadly match the transition rates and transition times of advanced Schottky TTL logic for easy circuit design. This results in lower power dissipation in the TTL multiplier compared to the ECL multiplier.

Functionality of the multiplier remains the same in both logic families, except that a minimum gate-delay implementation is used in inputs and outputs of the ECL multiplier to take maximum advantage of the inherent speed of the emitter-coupled logic family. Elements common to both versions are described with reference to the ECL version, shown in FIGS. 1A and 8A, and identified by like reference numerals in FIGS. 1B and 8B. Subscripts are used to identify elements that are functionally equivalent but adapted to their respective logic family. The features that are unique to each embodiment are separately described and uniquely identified by reference numerals in their respective figures. Specifics of the circuitry required in each version to adapt to the particular logic family are within the skill of the ordinary designer and so are not described. Essentially, TTL conversion circuitry (not shown) is added to the inputs and the data output circuitry is designed to provide TTL-compatible output data. Flag outputs are inverted to conform to different conventions in the two logic families.

Multiplier circuit 10a in FIG. 1A and multiplier circuit 10b in FIG. 1B are both fabricated by the bipolar VLSI process described in the last two articles cited above. This process utilizes a self-aligned polysilicon bipolar process with a minimum mask features size of 2 um. The transistor area produced by this process is 14 um$^2$, with a single polysilicon contact layer and metal interconnection lines provided by two layers of 4 um-pitch gold metallization. A typical transistor has a cut-off frequency $f_t$ greater than 5 GHz at 50 uA and a loaded gate propagation delay of 300–450 ps. The multiplier 12 has an array size of 121×135 mils, for 11,600 transistors required. At room temperature the multiplier array dissipates about 1.8 W. Interface and other functional circuits raise the overall transistor count of the multiplier circuit 10a or 10b to about 13,800 transistors in a 166×178 mil area. Typical total power is about 2.9 W for the ECL multiplier 10a and 2.2 W for the TTL multiplier 10b. The chip is mounted in a 108-pin two-layer ceramic pin-grid-array (PGA) package, directly on a metal slug, which provides a low profile and low thermal resistance. Separate power supply pins are provided for the internal array and the output buffers to assure maximum noise margins. Multiple output ground pins are used to minimize signal path resistance and inductance for the outputs, which are terminated at 50 ohms. Ground planes within the two-layer PGA package maintain the transmission line impedance and minimize cross talk. The following Tables 1A and 1B are tables of recommended operating and test conditions and electrical characteristics of the multipliers of FIG. 1A and 1B, respectively, as implemented in a very large scale integrated circuit;

TABLE 1A

Recommended Operating and Test Conditions

| Parameter | Symbol | Min | Nom | Max | Units |
|---|---|---|---|---|---|
| Supply Voltage ($V_{cc} = 0$) | $V_{cc}$ | −5.46 | −5.20 | −4.94 | $V_{dc}$ |
| Ambient Temperature | $T_a$ | 0 | | 70 | °C. |
| Input Voltage High | $V_{ih}$ | −1.13 | | −0.81 | $V_{dc}$ |
| Input Voltage Low | $V_{il}$ | −1.95 | | −1.48 | $V_{dc}$ |
| Output Termination to −2.0 $V_{dc}$ | $R_t$ | | 50 | | Ohms |
| Input Setup Time | $t_s$ | 0.5 | | | ns |
| Input Hold Time | $t_h$ | 1.0 | | | ns |
| Clock and Latch Enable Pulse Duration | $t_c$ | 1.5 | | | ns |

Electrical Characteristics

| Parameter | Symbol | Min | Nom | Max | Units |
|---|---|---|---|---|---|
| Supply Current ($V_{cc}$ = Min) | $V_{cc}$ | −825 | −550 | | mA$_{dc}$ |
| Input Current High ($V_{ih}$ = Max) | $V_{ih}$ | | | 150 | μA$_{dc}$ |
| Input Current Low ($V_{il}$ = Max) | $V_{il}$ | | | 100 | μA$_{dc}$ |
| Output Voltage High (Terminated) | $V_{oh}$ | −0.98 | | −0.60 | $V_{dc}$ |
| Output Voltage Low (Terminated) | $V_{ol}$ | −1.95 | | −1.63 | $V_{dc}$ |
| Clocked Multiply Time | $t_{mc}$ | | 5.0 | 8.0 | ns |
| Output Delay | $t_{od}$ | | 1.0 | 2.5 | ns |
| Unclocked Multiply Time | $t_{muc}$ | | 6.0 | 10.5 | ns |
| Output Clocked Multiply Time | $t_{moc}$ | | 5.0 | 8.5 | ns |
| Input Clocked Multiply Time | $t_{mic}$ | | 6.0 | 10.5 | ns |
| Output Disable Delay | $t_{dao}$ | | 1.0 | 2.0 | ns |
| Output Enable Delay | $t_{eno}$ | | 1.0 | 2.0 | ns |

TABLE 1B

Recommended Operating and Test Conditions

| Parameter | Symbol | Min | Nom | Max | Units |
|---|---|---|---|---|---|
| Supply Voltage (GND = 0) | $V_{cc}$ | 4.75 | 5.00 | 5.25 | $V_{dc}$ |
| Ambient Temperature | $T_a$ | 0 | | 70 | °C. |
| Input Voltage High | $V_{ih}$ | 2.0 | | | $V_{dc}$ |
| Input Voltage Low | $V_{il}$ | | | 0.8 | $V_{dc}$ |
| Output Current High | $I_{oh}$ | | | −400 | μA$_{dc}$ |
| Output Current Low | $I_{ol}$ | | | 4.0 | mA$_{dc}$ |
| Input Setup Time | $t_s$ | 3 | | | ns |
| Input Hold Time | $t_h$ | 0 | | | ns |
| Clock and Latch Enable Pulse Duration | $t_c$ | 4.5 | | | ns |

Electrical Characteristics

| Parameter | Symbol | Min | Nom* | Max | Units |
|---|---|---|---|---|---|
| Supply Current ($V_{cc}$ = Max) | $I_{cc}$ | | 440 | 675 | mA$_{dc}$ |
| Input Current High ($V_{cc}$ = Max, $V_{ih}$ = 2.4) | $I_{ih}$ | | | 200 | μA$_{dc}$ |
| Input Current Low ($V_{cc}$ = Max, $V_{il}$ = 0.4) | $I_{il}$ | | | −0.2 | mA$_{dc}$ |
| Output Voltage High ($V_{cc}$ = Min, $I_{oh}$ = Max) | $V_{oh}$ | 2.4 | | | $V_{dc}$ |
| Output Voltage Low ($V_{cc}$ = Min, $I_{ol}$ = Max) | $V_{ol}$ | | | 0.4 | $V_{dc}$ |
| High Impedance Output Current | $I_{ozh}$ | | | 40 | μA$_{dc}$ |

TABLE 1B-continued

| | | | | |
|---|---|---|---|---|
| ($V_{cc}$ = Max, $V_o$ = 2.4) | | | | |
| High Impedence Output Current | $I_{ozl}$ | | −40 | $\mu A_{dc}$ |
| ($V_{cc}$ = Max, $V_o$ = 0.4) | | | | |
| Clocked Multiply Time | $t_{mc}$ | 6.0 | 9.0 | ns |
| Output Delay (Load Test Circuit) | $t_{od}$ | 10.0 | 25.0 | ns |
| Unclocked Multiply Time (Load Test Circuit) | $t_{muc}$ | 16.0 | 34.0 | ns |
| Output Clocked Multiply Time | $t_{moc}$ | 8.0 | 11.0 | ns |
| Input Clocked Multiply Time (Load Test Circuit) | $t_{mic}$ | 15.0 | 33.0 | ns |
| Output Multiplexer Select Delay (Load Test Circuit) | $t_{sel}$ | 10.0 | 25.0 | ns |
| Output Disable Delay (Load Test Circuit) | $t_{dao}$ | 10.0 | 25.0 | ns |
| Output Enable Delay | $t_{eno}$ | 10.0 | 25.0 | ns |

*$V_{cc}$ = 5.0 Volts, $T_s$ = 25° C.

Multiplier Architecture

Referring to the left portion of FIGS. 1A and 1B, data and instructions are input via a set of latches, generally designated by reference numeral 14 for both the ECL multiplier 10a in FIG. 1A and the TTL multiplier 10b in FIG. 1B. The input latches of each circuit are controlled by first clock and enable circuitry 16. Referring to the right side of FIGS. 1A and 1B, multiplier product data and status information are output from the multiplier 12 via a set of output data and status latches. These latches are generally designated by reference numeral 18a in ECL multiplier 10b and by reference numeral 18b in TTL multiplier 10b. The output latches are controlled by second output clock and enable circuitry 20A, 20B. The ECL multiplier 10a has an ECL output and associated control circuitry, generally designated by reference numeral 22. The TTL multiplier 10b has TTL-compatible output and associated control circuitry, generally designated by reference numeral 24, including a data multiplexer 26. FIG. 2 shows how the multiplier result from ECL multiplier 10a can be multiplexed by paralleling its output pins and selectively enabling the most and least significant 16-bit portions of the output product.

Referring back to the left side of FIGS. 1A and 1B, a first 16-bit operand is input via X latch 30. Associated with the X latch is a single-bit XM latch 32 for inputting a single-bit X mode instruction to indicate whether the operand is unsigned or signed two's complement mode. A second 16-bit Y operand is input through Y latch 34, with the mode of the operand indicated by a single-bit Y mode instruction input to a YM latch 36. These latches all have outputs connected to inputs of multiplier 12. FIG. 3 shows the various states of the operands in each mode.

Operation of the X latch 30 and Y latch 34, and their respective mode latches 32, 34, is controlled by the first clock and enable circuitry 16. This circuitry includes two AND gates 38, 40, each having two inverted inputs and an output connected to an input of an OR gate 42. Each of the AND gates has, as one input, an inverted clock signal $\overline{CK1}$; AND gate 38 has an inverted Y enable signal $\overline{YEN}$; and AND gate 40 has an inverted X enable signal input $\overline{XEN}$. The output of gate 38 is connected, additionally, to an enable input of Y latch 34. AND gate 40 has its output additionally connected to an enable input of X latch 30.

Three additional single-bit instruction input latches are provided. These include a "format adjust" (FA) instruction latch 44, a "load" (LD) instruction latch 46 and a "round" (RND) instruction latch 48. Each of these latches has a single input and a single output. These latches are enabled by the output of OR gate 42 so that they operate when either the clock signal CK1, or the Y enable and X enable signals YEN, XEN, or all three signals, are high.

Returning to the right side of FIGS. 1A and 1B, multiplier 12 outputs an intermediate Z result which, in a 16×16 multiplier, includes 32 parallel bits comprising sixteen least significant bits and sixteen most significant bits. The Z result is input to a 32-bit format adjust multiplexer 50. When enabled by a format adjust instruction via latch 44, the multiplexer shifts the entire Z result 1 bit position in the direction of the most significant bit (i.e., a single-bit left shift). Otherwise, the Z result remains unshifted. This operation is shown in FIG. 5. The shifted or unshifted Z result is output as a final, W result to the W latch 52. Like the Z result, the W result is 32 parallel bits. Storage of the W result in the W latch is controlled by a second clock signal CK2, input together with an enable signal to an AND gate 54a having its output connected to an enable input of the W latch. The W result is output (T OUTPUT) in two parts.

Figures 6A, 6B:
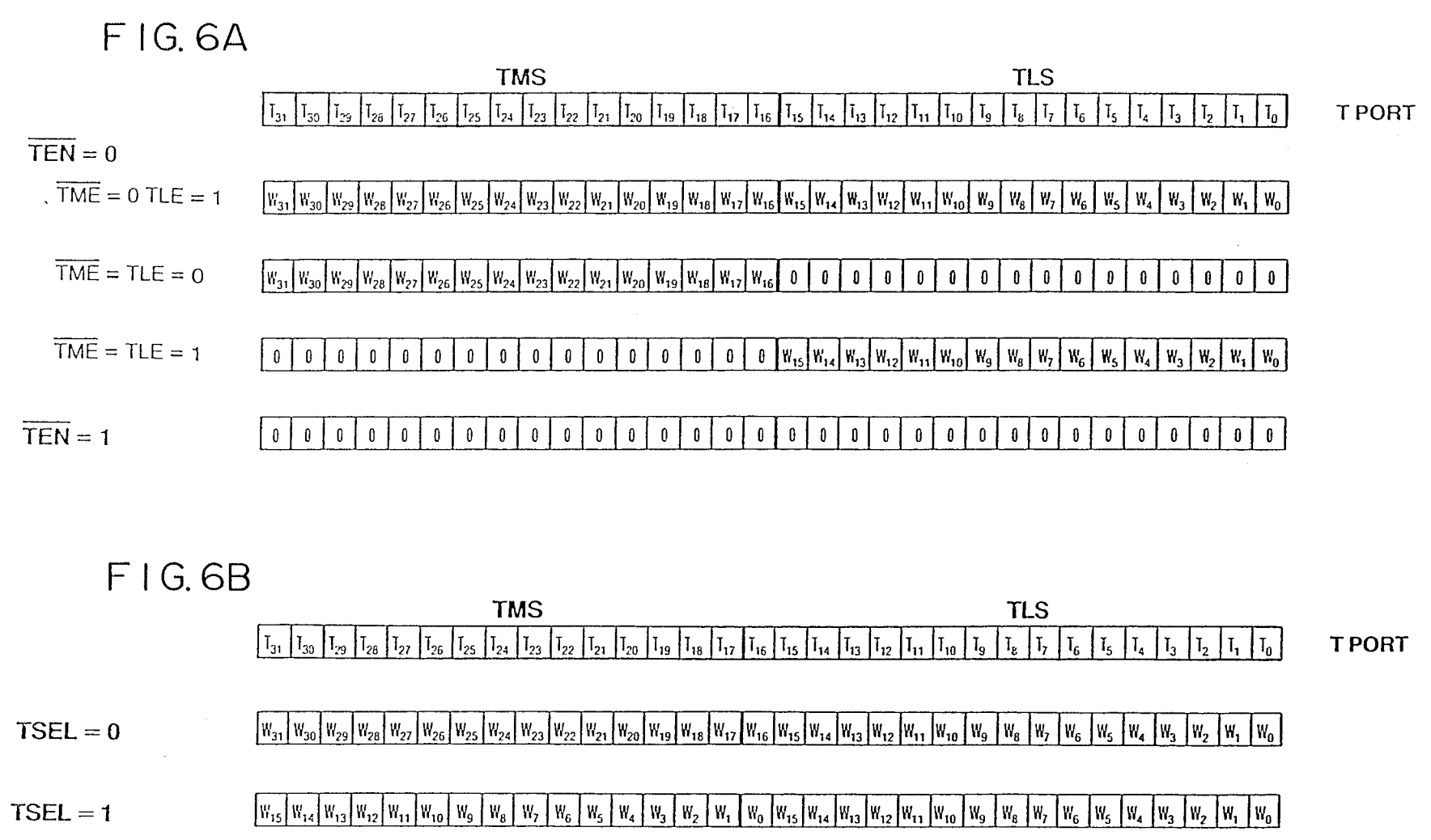

In multiplier 10a (FIG. 1A), the most significant bits are output through an array of sixteen AND gates 56a to sixteen output pins (TMS). The sixteen least significant bits are output through an array of sixteen AND gates 58a to 16 separate output pins (TLS). These output gates are controlled by three output enable signals through a pair of AND gates 60, 62. AND gate 60 has an output connected to an input of each of the AND gates 56. AND gate 62 similarly has an output connected to an input of each of the least significant bit output AND gates 58. Each of AND gates 60, 62 has an inverted input for an inverted output enable signal $\overline{TEN}$. Gate 60 additionally has an inverted input for an inverted most-significant-bits enable signal $\overline{TME}$. Gate 62 additionally has an input for a least-significant-bits enable signal TLE. These enable signals control when and what portion of the W result is output, as shown in FIG. 6a. The entire W result can be output as a 32 bit word on the outputs from AND gates 56a, 58a. Alternatively, as shown in FIG. 2, by connecting the least-significant-bit output lines in parallel with the most-significant-bit output lines, in order of significance, and by tying the inverted TME and TLE signals together, the W result can be multiplexed as two 16-bit words onto a 16-bit bus.

The TTL multiplier 10b in FIG. 1B has a TTL-compatible second clock enable gate 54b, and two 16-bit arrays of tri-state output buffers 56b, 58b for outputting the 16 most-significant and 16 least-significant bits, respectively. Multiplexer 26 is connected between W-latch 52 and gates 56b so that the most- and least-significant 16 bits can be multiplexed as two 16-bit words onto a 16-bit bus. FIG. 6b shows the different output states of the TTL multiplier.

The ECL multiplier 10a provides three separate status flags and corresponding logic circuitry and latches:

an overflow flag latch 64a, a zero flag latch 66a and a negative or sign flag latch 68a. As will be discussed further with reference to FIGS. 8A and 8B, each of these flags provides a positive indicator of the status of various conditions in the multiplier and multiplier output. In general, the overflow flag (OVFL) is set high via latch 64a when the multiplier product is $-1.0 \times -1.0 = +1.0$ and the format adjust instruction is set high at latch 44. Further details of operation of this flag are shown in FIG. 5. The zero status flag (ZERO) is set high via zero latch 66a when either the entire multiplier product or the rounded, most significant 16-bits of the multiplier product are equal to zero. The sign status flag (NEG) is set high via the negative latch 68a whenever one of the X or Y mode (XM, YM) instructions is enabled to indicate signed arithmetic and one but not both of the operands is negative. Operation of these flags is shown in FIG. 4. The TTL multiplier 10b - (FIG. 1B) also has status flag latches 64b, 66b, 68b. They are structured similarly and perform the same function as the corresponding latches in FIG. 1A, but have inverted outputs. The status latches 64a, 66a, 68a and 64b, 66b, 68b and associated logic are shown in further detail in FIGS. 8A and 8B, respectively, and further described below. Tables 2A and 2B identify the input and output signals and pins of integrated circuits embodying the multipliers of FIGS. 1A and 1B, respectively.

TABLE 2A

| Data | | |
|---|---|---|
| Inputs | X0-15, Y0-15 | 32 |
| Output | TLS0-15, TMS0-15 | 32 |
| Control | | |
| Latch Enables | $\overline{XEN}, \overline{YEN}, \overline{WEN}$ | 3 |
| Mode | XM, YM | 2 |
| Instructions | I0-2; FA, LD, RND | 3 |
| Flags | $\overline{OVFL}, \overline{ZERO}, \overline{NEG}$ | 3 |
| Output Enables | $\overline{TEN}, \overline{TME}, \overline{TLE}$ | 2 |
| Clocks | | |
| Inputs | CK1 | 1 |
| Outputs | CK2 | 1 |
| Power | | |
| Logic Gnd | VCC1 | 15 |
| Output Gnd | VCC2 | 7 |
| $-5.2$ V | VEE | 6 |
| Total | | 108 |

TABLE 2B

| Data | | |
|---|---|---|
| Inputs | X0-15, Y0-15 | 32 |
| Output | TLS0-15, TMS0-15 | 32 |
| Control | | |
| Latch Enables | $\overline{XEN}, \overline{YEN}, \overline{WEN}$ | 3 |
| Mode | XM, YM | 2 |
| Instructions | I0-2; FA, LD, RND | 3 |
| Flags | OVFL, ZERO, NEG | 3 |
| Output Select | TSEL | 1 |
| Output Enables | $\overline{TME}, \overline{TLE}$ | 2 |
| Clocks | | |
| Inputs | CK1 | 1 |
| Outputs | CK2 | 1 |
| Power | | |
| Logic Gnd | GND1 | 4 |
| Output Gnd | GND2 | 5 |
| Logic $-5.0$ V | VCC1 | 12 |
| Output $+5.0$ V | VCC2 | 7 |
| Total | | 108 |

Structure and Operation Of Multiplier Array

Figure 8A:
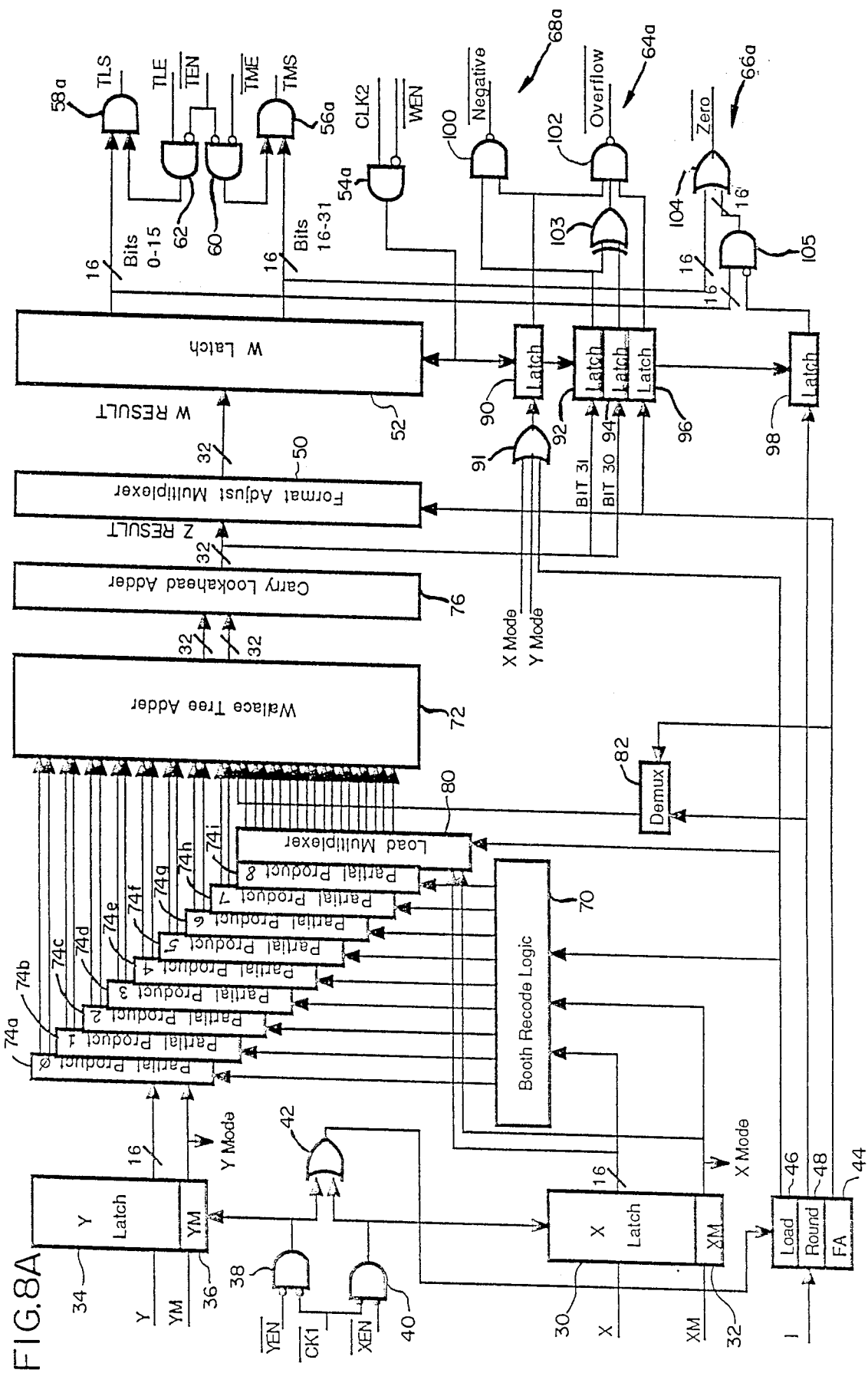
FIG. 8A is a more detailed block diagram of the multiplier of FIG. 1A.

FIGS. 8A and 8B show the internal structure of the multiplier array 12 of the multipliers shown in FIGS. 1A and 1B, respectively. The structure and operation of the multiplier array 12 is identical for both versions of the multiplier. Therefore, it is described for both versions by reference to FIG. 8A.

Referring to FIG. 8A, the multiplier array 12 is implemented with modified Booth recode logic 70, a Wallace tree adder 72 implemented with carry/save adders, a series of 9 circuit arrays 74a through 74i for generating 18-bit partial products, and a carry/lookahead adder 76 for summing the final products. In operation, the Y operand is input together with the YM bit to register 74a. Each array is implemented by a 16-bit-wide, two-input exclusive OR gate and an 18-bit-wide 2:1 multiplexer with enable. The multiplexer provides 17 outputs corresponding to the partial product. An 18th bit (the subtract bit) is provided to complete a two's-complement inversion. The X operand is input from the X latch, together with the X mode bit to the Booth recode logic 70. The Booth recode logic has three outputs connected to each of circuit arrays 74a through 74i: shift, subtract and disable. Each three outputs corresponds to two transitions between each three bits of the X operand, commencing with the two least significant bits, which operate on the Y operand to form each partial product in turn. The arrays for generating the partial products are offset from one another in two bit increments so that the two least significant bits of partial product zero from array 74a are output together with the subtract bit directly to the Wallace adder. The next two bits of partial product zero are added together with the two least significant bits of partial product one and its subtract bit from array 74b and the sum is output to the next two inputs of the Wallace tree adder. This procedure continues for the remaining intermediate partial products in array 74c-74h. through the last partial product 8 in register 74i. Partial product 8 is offset relative to partial product zero by 16 bits. The Wallace tree adder accumulates two thirty-two bit words which are output in parallel to carry/ahead adder 76, which adds these words together to produce the intermediate Z product, which is output to the format adjust multiplexer 50. The foregoing summarizes what is substantially conventional structure and operation of advanced multipliers and so further details of the modified Booth recode logic, the partial product arrays, the Wallace tree adder and the carry/lookahead adder need not be further described.

The basic structure of the multiplier 12 has been modified to enable the X and Y operands to be loaded directly from the inputs to the output without multiplication. This is done in the following way. A load multiplexer 80 is provided in tandem with register 74i. The load multiplexer has a 16-bit input from the X latch and a single bit input from the X mode latch 32. The load instruction latch 46 has an output connected to a select input of the load multiplexer to control its operation. The load multiplexer when selected, substitutes the X operand for the outputs from partial product 8. The load latch 46 also has an output connected to an enable input of the Booth recode logic 70. The circuitry of the Booth recode logic is modified to respond to the load instruction by disabling partial product one through partial product 7 and forcing partial product zero equal to the Y operand. During load, the Y operand is loaded into partial product zero and the X operand is loaded into the load multiplexer and all of the intermediate partial products 1 through 7 are set to zero. When the outputs of the partial products and the load multiplexer are summed through the Wallace tree adder and carry/-lookahead adder, the Z result is a thirty-two bit word in which the Y operand is concatenated with the X operand. Since the least significant bit of partial product 8 is one bit more significant than the most significant bit of partial product zero, this has the effect of concatenating X and Y. Because the concatenated X and Y result is inserted before the Wallace tree, rounding, format adjusting, and the flags operate in the same manner as for multiplication.

Rounding is performed in a way that is always correct, whether the Z result is format adjusted or not (see FIG. 4). This is done by a demultiplexer 82 which has a two-bit output connected to Wallace tree adder 72 as an input at the most significant of the least significant 16 bits and the next less significant bit (i.e., the 16th and 15th bit positions). The demultiplexer has two inputs. One input is an output from round latch 48 and the other, select input is an output from format adjust latch 44. The demultiplexer passes the output of the round latch to the outputs selected by the format adjust. If the output of the format adjust latch 44 is low, the demultiplexer inserts a binary one in the 16th bit position. When the output of the format adjust latch is high, the demultiplexer adds a one to the contents of the 15th bit position.

Status Flag Logic Circuitry

The lower right portions of FIGS. 8A and 8B show the logic circuitry used for generating the status flags.

Logically, this circuitry in each version is essentially identical, the only difference being that the outputs of one version are inverted relative to those of the other in accordance with the particular requirements of their respective logic families. The data that controls the operation of this circuitry to produce each of the status flags is input through a series of five latches. Latch 90 has an input from an OR gate 91 whose inputs in turn are the X mode, Y mode and load instructions. Latches 92, 94 each have as an input the two most significant bits of the Z result output from the carry/lookahead adder 76. Latch 96 has an output from the format adjust latch 44 as its input. Latch 98 has, as its input, an output from the round instruction latch 48. Each of these latches is enabled by the output of AND gate 54a from the second clock (CLK2).

The negative or sign flag 68a is generated by an NAND gate 100 having as its inputs, outputs from latches 90, 92. The sign of the Z result (bit 31) is thus enabled whenever one of the X mode, Y mode or load instructions is set.

The overflow flag 64a is set by a NAND gate 102, which has three inputs. The first input is the output of latch 90. The second input is the output of latch 96, which is high when the format adjust instruction output from latch 44 is set. The third input is the output of exclusive OR gate 103, the inputs of which are the outputs of latches 92, 94. Thus, an overflow status flag is set whenever one of the X mode, Y mode or load instructions is set, and the format adjust instruction is set, and the exclusive OR of the two most significant bits of the Z result (prior to being truncated by format adjustment) is equal to binary one.

The zero flag status 66a is output by an OR gate 104 having two inputs. One input is provided by the most significant 16 bits of the W product output from W latch 52. When the most significant bits are all zero, this input is zero. The second input is provided by the output of an AND gate 105. One input to this AND gate is the output from latch 68, which is in turn the round instruction output from latch 48. This output is inverted. The other inputs to gate 105 are provided by the least significant bits output from the W latch 52. Whenever any one of these bits is high, the output of gate 105 is high. The zero status flag is always enabled but its meaning is determined by whether or not the rounded instruction has been set. If rounding is not selected, this flag indicates a zero product only when all bits of the entire W product are zero. In the case of rounding, this flag indicates a zero when the most significant 16 bits of the W product are equal to zero, even though the truncated least significant bits may be greater than zero.

Multiplier Clock States

FIGS. 7A and 7B show timing diagrams and operation of the multiplier for the various states of the first clock (inverse CK1) and the second clock input (CK2). FIGS. 9A, 9B and 9C show how the various clock alternatives are connected to the multiplier. These diagrams are substantially self-explanatory. The definitions of the signals referenced in these diagrams are contained in Tables 3A and 3B and the definitions of the timing variables are contained in Tables 1A and 1B.

In unclocked operation, with inverse CK1=0 and CK2=1, operands input at the X and Y latches are automatically multiplied and passed to the output latch. This demonstrates one advantage of using latches for the inputs and outputs, rather than clocked registers. The multiplier can readily be used in a flow-through mode of operation. Reversing the polarity applied to the clock inputs causes the latches to hold incoming data.

The multiplier can also be operated in clocked mode, using separate clocks on each clock input, inverse CK1 and CK2. The phase and frequency of these clocks can be set over a wide range (up to 100 MHz) to accommodate different timing needs of various applications. The three clock mode enables the operand to be latched independently.

The multiplier can also be controlled by a single clock connected to both the clock inputs. Because the clock inputs are inverted relative to one another, this results in a master-slave operation. The operands are latched into the multiplier on the leading edge of a clock pulse and an output product (or concatenated operands) is clocked out on the falling edge of the clock. The multiplier behaves, in effect, like a clocked register but performs a multiplication or concatenation in the middle of the clock pulse. Tables 3A and 3B below are glossaries defining the input and output signals for the multipliers of FIGS. 1A and 1B, respectively.

TABLE 3A

| Signal Description | |
|---|---|
| Data | |
| X0-15 | X operand input port. Bit 0 is least significant bit. |

TABLE 3A-continued

| Signal | Description |
|---|---|
| Y0-15 | Y operand input port. |
| TMS0-15 | Most significant 16 bits of 32-bit output port T. |
| TLS0-15 | Least significant 16 bits of 32-bit output port T. |
| Control | |
| $\overline{\text{XEN}}$, $\overline{\text{YEN}}$, $\overline{\text{WEN}}$ | Enable input for data latches X and XM, Y and YM and W respectively. |
| XM, YM | Inputs to XM and YM mode latches. Determine unsigned (XM, YM = 0) or two's complement (XM, YM = 1) mode of X and Y operands. See FIG. 1. Latches enabled by $\overline{\text{XEN}}$ and $\overline{\text{YEN}}$ respectively and clicked by CK1. |
| I0-2 | Instruction input port to Format Adjust, Load and Round instruction latches respectively. Latches enabled by $\overline{\text{XEN}}$ or $\overline{\text{YEN}}$ and clocked by CK1. |
| FA | Format Adjust provides a choice of output data format in result W depending on system requirements. See FIG. 3. |
| LD | Loads the intermediate result Z with the concatenated X and Y operands when LD = 1, XM determines the sign mode of the result. When LD = 0 the intermediate result Z is the product of the operands X and Y. Rounding and Format Adjust are always applied to the intermediate result Z and status flags are generated. See FIG. 2. |
| RND | The full precision format-adjusted W result is rounded to the nearest most significant 16-bit portion. |
| ZERO, OVFL, NEG | Output status flags generated from the intermediate result Z. The ZERO latch is set when the full 32-bit result is zero, or if RND = 1, when the rounded most significant 16-bit only result is zero. ZERO will not set if an overflow condition exists. The OVFL latch is set only on a two's complement number, when due to output format adjustment, data has exceeded what can be represented in the output format. The NEG latch is set only when the two's complement result is negative. A loaded format-adjusted negative overflow number will set NEG as well as OVFL Flag latches are enabled by $\overline{\text{WEN}}$ and clocked by CK2. |
| $\overline{\text{TEN}}$ | Output enable for all 32-bits of output port T (TMS and TLS). See FIG. 4. |
| $\overline{\text{TME}}$, $\overline{\text{TLE}}$ | Output enables for TMS and TLS ports respectively when $\overline{\text{TEN}}$ = 0. |
| Clocks | |
| $\overline{\text{CK1}}$ | Clock input to all input latches X, XM, Y, YM and I(FA, LD, RND). Data is held in the enabled latch when CK1 = 1, the enabled latch follows input data when $\overline{\text{CK1}}$ = 0. The input latches are made transparent by holding $\overline{\text{CK1}}$ = 0 and their enables low. |
| CK2 | Clock input to all output latches W, ZERO, OVFL and NEG. Data is held in the enabled latches when CK2 = 0, the enabled latches follow data when CK2 = 1. The output latches are made transparent by holding CK2 = 1 and $\overline{\text{WEN}}$ = 0. |
| Power | |
| VCC1 | Most positive supply voltage to internal logic circuitry. Usually ground. |
| VCC2 | Most positive supply voltage to output circuitry. Usually ground. |
| VEE | Most negative supply voltage. |

TABLE 3B

| Signal | Description |
|---|---|
| Data | |
| X0-15 | X operand input port. Bit 0 is least significant bit. |
| Y0-15 | Y operand input port. |
| TMS0-15 | Most significant 16 bits of 32-bit output port T. |
| TLS0-15 | Least significant 16 bits of 32-bit output port T. |
| Control | |
| $\overline{\text{XEN}}$, $\overline{\text{YEN}}$, $\overline{\text{WEN}}$ | Enable input for data latches X and XM, Y and YM and W respectively. |
| XM, YM | Inputs to XM and YM mode latches. Determine unsigned (XM, YM = 0) or two's complement (XM, YM = 1) mode of X and Y operands. See FIG. 1. Latches enabled by $\overline{\text{XEN}}$ and $\overline{\text{YEN}}$ respectively and clocked by CK1. |
| I0-2 | Instruction input port to Format Adjust, Load and Round instruction latches respectively. Latches enabled by $\overline{\text{XEN}}$ or $\overline{\text{YEN}}$ and clocked by CK1. |
| FA | Format Adjust provides a choice of output data format in result W depending on system requirements. See FIG. 3. |
| LD | Loads the intermediate result Z with the concatenated X and Y operands when LD = 1, XM determines the sign |

TABLE 3B-continued

| | Signal Description |
|---|---|
| | mode of the result. When LD = 0 the intermediate result Z is the product of the operands X and Y. Rounding and Format Adjust are always applied to the intermediate result Z and status flags are generated. See FIG. 2. |
| RND | The full precision format-adjusted W result is rounded to the nearest most significant 16-bit portion. |
| ZERO, OVFL, NEG | Output status flags generated from the intermediate result Z. The ZERO latch is set when the full 32-bit result is zero, or if RND = 1, when the rounded most significant 16-bit only result is zero. ZERO will not be set if an overflow condition exists. The OVFL latch is set only on a two's complement number, when due to output format adjustment, data has exceeded what can be represented in the output format. The NEG latch is set only when the two's complement result is negative. A loaded format-adjusted negative overflow number will set NEG as well as OVFL Flag latches are enabled by $\overline{\text{WEN}}$ and clocked by CK2. |
| TSEL | Input that selects the least or most significant 16-bits of result W for output through the TMS port. TSEL = 0 is the most significant portion, TSEL = 1 is the least significant portion. See FIG. 4. |
| $\overline{\text{TME}}$, $\overline{\text{TLE}}$ | Inputs to enable the three-state outputs of the TMS and TLS ports respectively. |
| Clocks | |
| CK1 | Clock input to all input latches X, XM, Y, YM and I(FA, LD, RND). Data is held in the enabled latch when CK1 = 1, the enabled latch follows input data when CK1 = 0. The input latches are made transparent by holding CK1 = 0 and their enables low. |
| CK2 | Clock input to all output latches W, ZERO, OVFL and NEG. Data is held in the enabled latches when CK2 = 0, the enabled latches follow data when CK2 = 1. The output latches are made transparent by holding CK2 = 1 and $\overline{\text{WEN}}$ = 0. |
| Power | |
| VCC1 | Positive supply voltage to internal logic circuitry. |
| VCC2 | Positive supply voltage to output circuitry. |
| GND1 | Negative supply voltage to internal logic circuitry. |
| GND2 | Negative supply voltage to output circuitry. |

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

We claim:

1. In an integrated circuit, a mulitiplier architecture comprising:
   first data input means for inputting a binary X-operand comprising an array of M parallel bits wherein M is an integer greater than or equal to 1;
   second data input means for inputting a binary Y-operand comprising an array of N parallel bits wherein N is an integer greater than or equal to 1;
   binary multiplier means for multiplying the X-operand and the Y-operand to produce a binary product comprising an array of M+N parallel bits;
   means for inputting a load instruction into the multiplier means;
   load means in the multiplier means responsive to the load instruction for concatenating the X operand and Y operand without multiplying said operands to produce, as said product, a concatenated result in which the M most significant bits are the X operand and the N least significant bits are the Y operand;
   and output means for outputting the product.

2. A multiplier architecture according to claim 1 in which the output means is separate from the first and second input means and includes means for outputting the entire product as a parallel array of M+N bits.

3. A multiplier architecture according to claim 1 in which the output means is separate from the first and second input means and includes means for outputting the product as a pair of time-multiplexed subsets of the product.

4. A multiplier architecture according to claim 1 in which each array is ordered from most significant to the least significant bit; means including:
   means for generating
   the binary multiplier from said operands a series of ordered partial products including a first partial product comprising the least significant bit of the X operand times the Y operand, a last partial product comprising the most significant bit of the X operand times the Y operand, and at least one intermediate partial product comprising a bit between the least and most significant bits of the X operand times the Y operand;
   means for ordering the partial products in an array in accordance with the significance thereof such that each intermediate and the last partial product is offset by a predetermined number of bits in the direction of the more significant bits from an adjacent partial product of less significance, and the first and last partial products are offset so that the least significant bit of the last partial product is more significant than the most significant bit of the first partial product; and adder means for adding the partial products in accordance with their significance to produce said binary product;

the load means including:

first means responsive to the load instruction for inputting the Y operand into the first partial product;

second means responsive to the load instruction for inputting binary zeroes into the intermediate partial products; and third means responsive to the load instruction for inputting the X operand into the last partial product, so that operation of the adding means concatenates the X operand and the Y operand to form said concatenated result.

5. A multiplier architecture according to claim 4 in which the third means comprises a multiplexer.

6. A mulitplier architecture according to claim 1, wherein the binary product is an intermediate Z-product, said multiplier architecture including:

means for inputting a format adjust signal to indicate whether the X and Y operands are signed binary fractions; and format adjust means selectively responsive to the format adjust signal for shifting the entire Z-product one bit in a direction of the most significant bit to produce a W-product of 2M parallel bits;

the output means being arranged to output the W-product.

7. A multiplier architecture according to claim 6 including means responsive to said shifting of the Z product to insert a zero bit in the position of the least significant bit in the W product.

8. A multiplier architecture according to claim 6 including:

means for inputting a rounding instruction;

means responsive to the rounding instruction for adding a binary one to a selected one of the Mth or (M−1)th significant bit positions of the unshifted Z product; and means selectively responsive to the format adjust signal for selecting the (M−1)th bit when the Z product is to be shifted.

9. A multiplier architecture according to claim 8 including means for setting a zero status flag when a portion of the W product to be output is equal to zero.

10. A multiplier architecture according to claim 6 including means responsive to said shifting for detecting a Z product of $-1.0 \times -1.0 = +1.0$ and setting an overflow status flag.

11. A multiplier architecture according to claim 1, in which the operands and the products can each include a sign bit, said multiplier architecture including:

means for inputting an operand mode instruction to indicate whether each operand is an unsigned or a two's-complement operand; and means responsive to the mode instruction for setting a sign status bit in accordance with a sign bit of the binary product.

12. A multiplier architecture according to claim 1 in which each of the first and second data input means is a latch controlled by a first clock signal input and the output means is a latch controlled by a second clock signal input, the output latch being responsive to a clock signal transition that is opposite to the clock transition to which the input latch is responsive, so that the first and second clock signal inputs may be paralleled to provide single-clock edge-triggered-like operation.

13. In an integrated circuit, a multiplier architecture comprising:

first data input means for inputting a binary X-operand comprising an array of N parallel bits wherein is an integer greater than or equal to 1;

second data input means for inputting a binary Y-operand comprising an array of M parallel bits wherein is an integer greater than or equal to 1;

binary multiplier means for multiplying the X-operand and the Y-operand to produce a binary intermediate Z-product comprising an array of N+M parallel bits;

each array being ordered from most significant to the least significant bit;

format instruction means for inputting a format adjust signal;

format adjust means selectively responsive to the format adjust signal for shifting the entire Z-product one bit in the direction of the most significant bit to produce a W-product of N+ M parallel bits; and output means for outputting the W product;

whereby the X and Y operands can be signed binary fractions containing a binary point at a predetermined position; and a binary point in the W-product can be aligned with the binary point in one of the X and Y operands.

14. A multiplier architecture according to claim 13 including means responsive to said shifting of the Z product to insert a zero bit in the position of the least significant bit in the W product.

15. A multiplier architecture according to claim 13 including means responsive to said shifting for detecting a product of $-1.0 \times -1.0 = +1.0$ and setting an overflow status flag.

16. A multiplier architecture according to claim 13 including:

means for inputting a rounding instruction;

means responsive to the rounding instruction for adding a binary one to a selected one of the Mth or (M−1)th significant bit positions of the unshifted Z product;

means selectively responsive to the format adjust signal for selecting the (M−1)th bit when the Z product is to be shifted.

17. A multiplier architecture according to claim 16 including means for setting a zero status flag when a portion of the W product to be output is equal to zero.

18. A multiplier architecture according to claim 13, in which the operands and the products can each include a sign bit, said multiplier architecture including:

means for inputting an operand mode instruction to indicate whether each operand is an unsigned or a two's-complement operand; and means responsive to the operand mode instruction for setting a signed status bit in accordance with a sign bit of the Z-product.

19. A multiplier architecture according to claim 13 in which the output means is separate from the first and second input means and is arranged for outputting the entire W-product as a parallel array of N+M bits.

20. A multiplier architecture according to claim 13, in which the output means is separate from the first and second input means and including a multiplexer for outputting a selected one of the entire W-product of N+M bits and a subset thereof, as a parallel array.

21. A multiplier architecture according to claim 13 including means for inputting a load instruction and means responsive to the load instruction for concatenating the X operand and Y operand without multiplying said operands to produce, as the Z-product, a result in which the M most significant bits are the X operand and the N least significant bits are the Y operand.

22. A multiplier architecture according to claim 21, in which the output means is separate from the first and second input means and is arranged for outputting the entire W-product as a parallel array of N+M bits.

23. A multiplier architecture according to claim 22, in which the output means includes means for outputting a selected one of the entire W-product of N+M bits and a subset thereof, as a parallel array.

24. A multiplier architecture according to claim 22 in which each of the first and second data input means is a latch controlled by a first clock signal input and the output means is controlled by a second clock signal input, the first clock signal input being inverted relative to the second clock signal input.

25. In an integrated circuit, a multiplier architecture comprising:
first data input latch means for inputting a binary X-operand comprising an array of N parallel bits wherein N is an integer greater than or equal to 1;
second data input latch means for inputting a binary Y-operand comprising an array of M parallel bits wherein M is an integer greater than or equal to 1;
binary multiplier means for multiplying the X-operand and the Y-operand to produce a binary product comprising an array of N+M parallel bits;
an output latch means for outputting the product in the form of said array of N[30 M parallel bits;
each of said latch means being controlled by a two-polarity enable signal for passing binary data in response to a first polarity and holding binary data in response to a second polarity of the enable signal;
first enable signal input means for inputting a first enable signal to the first and second input latch means; and
second enable signal input means for inputting a second enable signal to the output latch means
so that applying an enable signal of the first polarity to both the first and second enable signal input means enables the operands to pass through the input latch means to be multiplied and enables the product to pass through the output latch means to an output.

26. A multiplier architecture according to claim 25 including:
first clock signal input means for inputting a first clock signal to the first and second input latch means;
second clock signal input means for inputting a second clock signal to the output latch means;
the first and second clock signal input means being inverted relative to one another so that applying a single clock signal to both clock signal input means causes the operands to be held for multiplication by the multiplier means upon occurrence of a leading edge of the clock signal and the product to be held at the output of the output latch means upon occurrence of a trailing edge of the clock signal.

27. A multiplier architecture according to claim 26, in which each of said input latch means is a latch, responsive to a first control signal, the first control signal being active when both the first enable signal and first clock signal are active.

28. A multiplier architecture according to claim 26, in which the output latch means is a latch, responsive to a second control signal, the second control signal being active when both the second enable signal and the second clock signal are active.

29. A multiplier architecture according to claim 25, wherein the output of the multiplier means is an intermediate Z product, said multiplier architecture including:
a format instruction latch means responsive to said first enable signal for inputting a format adjust signal to indicate whether the X and Y operands are signed binary fractions;
format adjust means selectively responsive to the format adjust signal for shifting the entire Z-product one bit in a direction of the most significant bit to produce a W-product of N+M parallel bits; and
output means for outputting the W product via the output latch means.

30. A multiplier architecture according to claim 29 including a status flag latch means responsive to said second enable signal for setting status flags; the status flag latch means including overflow flag latch means responsive to the format adjust signal for setting an overflow flag in accordance with the most significant bit of the Z-product.

31. A multiplier architecture according to claim 25 including an input load instruction latch means responsive to said first enable signal for inputting a load instruction and load means responsive to the load instruction for concatenating the X operand and Y operand without multiplying said operand to produce as said product a result in which the M most significant bits are the X operand and the N least significant bits are the Y operand.

32. A multiplier architecture according to claim 25, in which the operands and the product can each include a sign bit, said multiplier architecture including:
mode latch means responsive to said first enable signal for inputting an operand mode instruction to indicate whether each operand is an unsigned or a two's-complement operand; and
sign status latch means responsive to said second enable signal and to the mode instruction for setting a sign status flag in accordance with a sign bit of the product.

33. A multiplier architecture according to claim 25 including an input round instruction latch means responsive to said first enable signal for inputting a round instruction; round means responsive to the round instruction for rounding the product to an array of N bits; and zero status latch means responsive to said second enable signal and to the round instruction for setting a zero status flag in accordance with the value of the output product.

34. In an integrated circuit, a multiplier architecture comprising:
first clock input means for receiving a first clock signal;
first data input means responsive to the first clock signal for receiving and storing a binary X-operand;
second data input means responsive to the first clock signal for receiving and storing a binary Y-operand;
binary multiplier means for multiplying the X-operand and the Y-operand independently of the frequency of the first clock signal to produce a binary product;

second clock input means for receiving a second clock input signal; and output latch means connected to the binary multiplier means to receive the binary product for latching the product in response to the second clock input signal.

35. A multiplier architecture according to claim 32 wherein:

the first and second input means are responsive to a leading edge of the first clock signal; and the output latch means is responsive to a trailing edge of the second clock signal so that a single clock signal can be provided to both the first and second clock input means for clocking the input means and the output latch means in a master-slave mode.

* * * * *

UNITED STATES PATENT AND TRADEMARK OFFICE
CERTIFICATE OF CORRECTION

PATENT NO. : 4,841,468

DATED : June 20, 1989

INVENTOR(S) : Bruce E. Miller & Robert E. Owen

It is certified that error appears in the above-identified patent and that said Letters Patent is hereby corrected as shown below:

Column 3,          line 44, change "(CK1)" to --($\overline{CK1}$)--;

line 47, change "(CK1)" to --$\overline{CK1}$--;

Column 6,          line 21, change "circuit;" to --circuit:--;

Table 1A,          under section entitled Electrical Characteristics, under heading Symbol:
line 1, change "Vee" to --Iee--;
line 2, change "Vih" to --Iih--;
line 3, change "Vil" to --Iil--;

Table 2B,          line 65, under heading Data, change "Logic -" to --Logic +--.

Signed and Sealed this

Twenty-third Day of July, 1991

Attest:

HARRY F. MANBECK, JR.

Attesting Officer          Commissioner of Patents and Trademarks